May 24, 1960 W. R. CALVERT 2,937,490
CATALYTIC PURIFICATION OF EXHAUST GASES
Filed Aug. 12, 1957 2 Sheets-Sheet 1
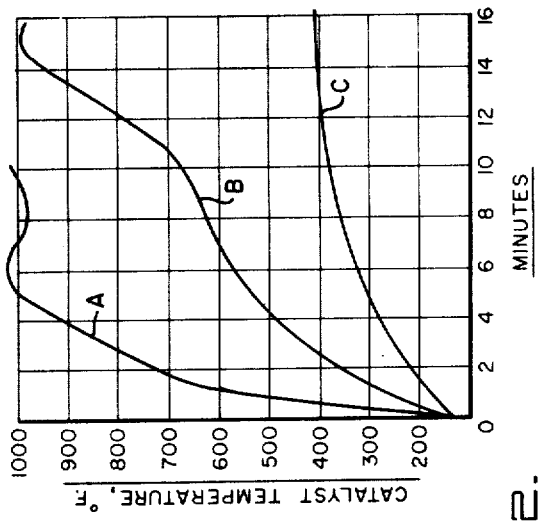
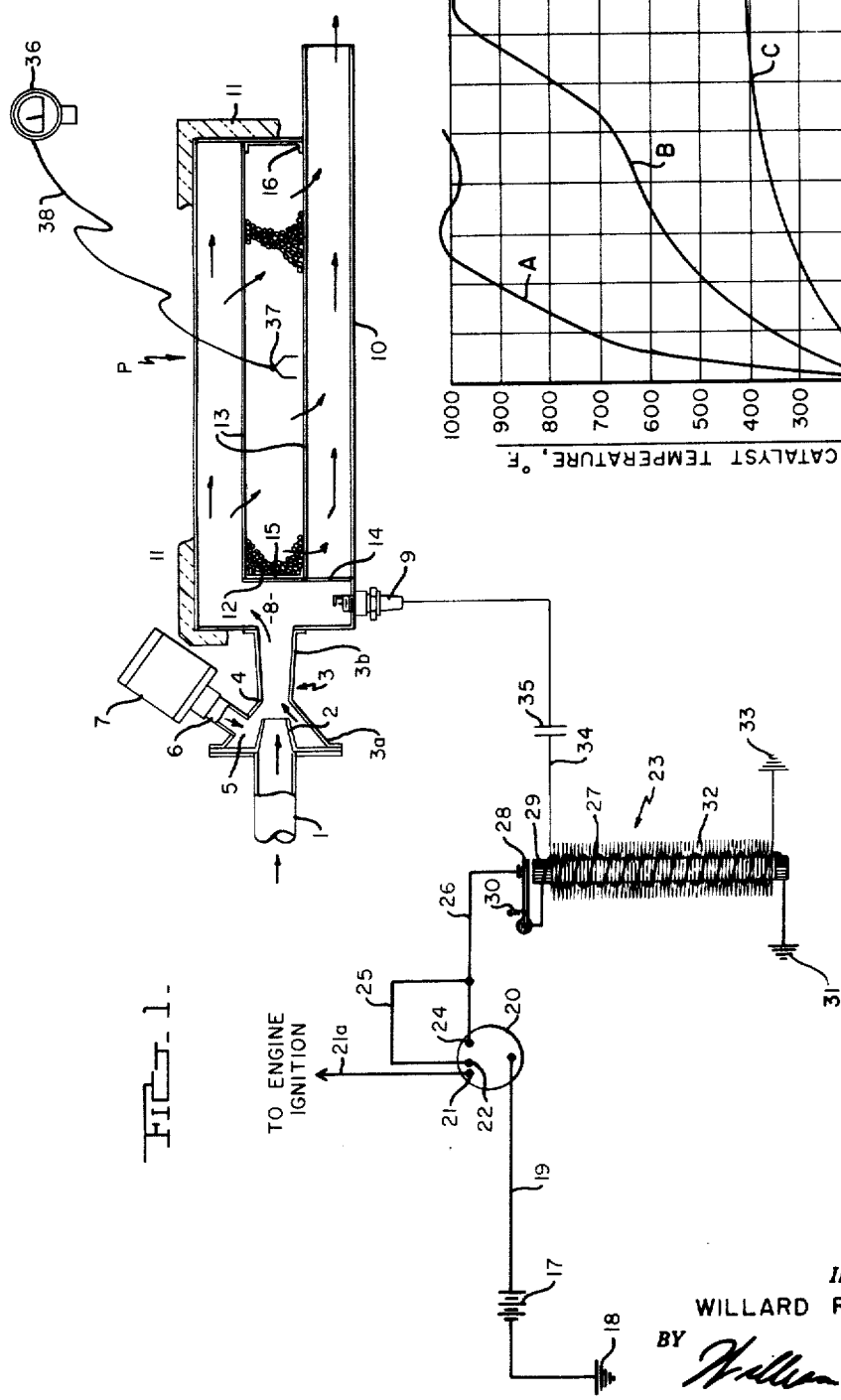
INVENTOR.
WILLARD R. CALVERT
BY
ATTORNEY

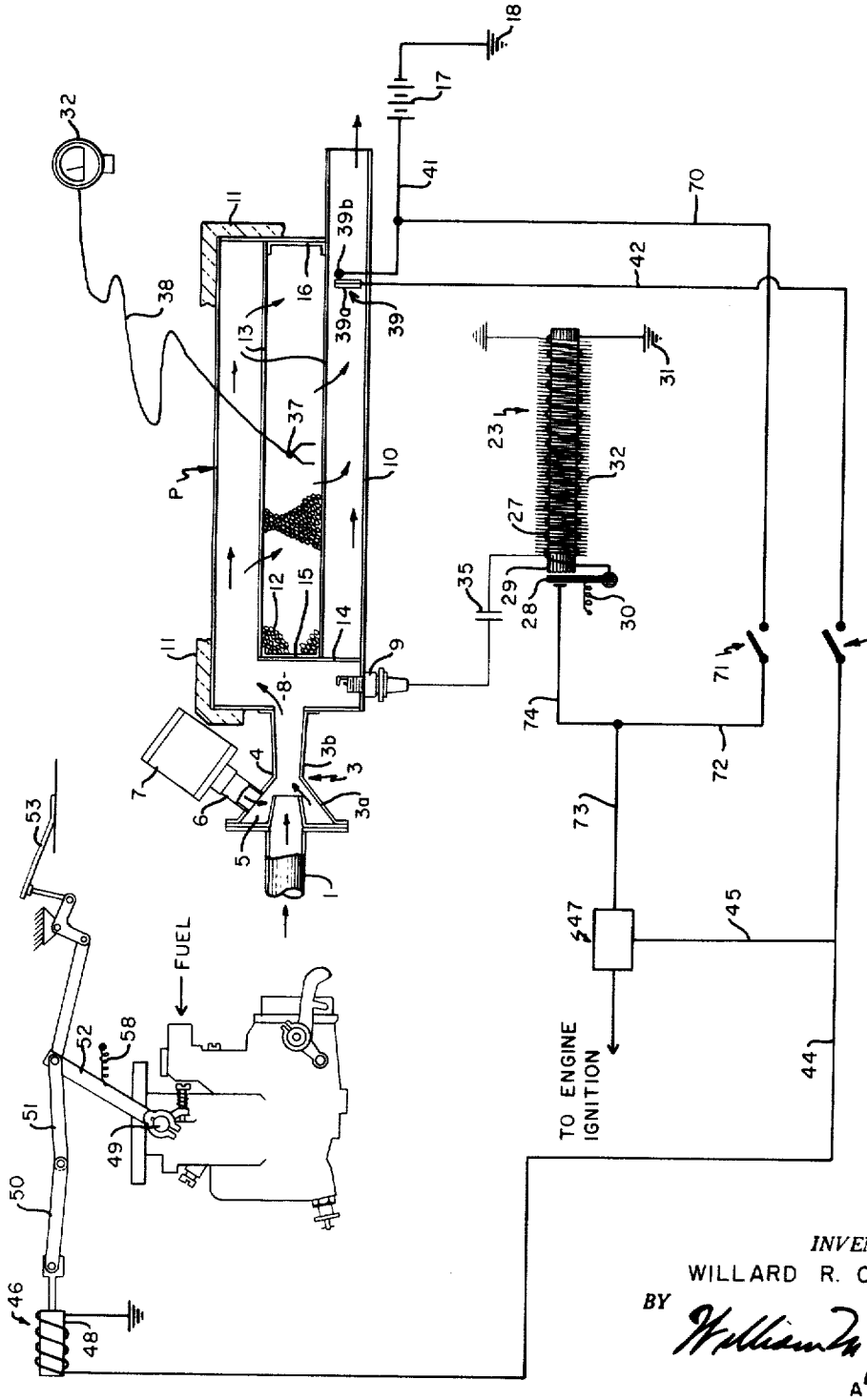

United States Patent Office 2,937,490
Patented May 24, 1960

2,937,490

CATALYTIC PURIFICATION OF EXHAUST GASES

Willard R. Calvert, Ridley Park, Pa., assignor to Oxy-Catalyst, Inc., a corporation of Pennsylvania Filed Aug. 12, 1957, Ser. No. 677,618

9 Claims. (Cl. 60—30)

This invention relates to catalytic exhaust purifiers for spark-fired internal combustion engines.

One of the greatest difficulties encountered in the operation of a catalytic exhaust purifier for internal combustion engines is that of initially heating the catalyst mass from ambient temperatures to catalyst activation temperature, that is the temperature at which the catalyst is effective to promote the oxidation of the combustibles in the exhaust stream at an appreciable rate. Catalysts having suitable stability both from a standpoint of catalytic activity and physical strength have activation temperatures generally in excess of 400° F. even when freshly prepared. Below this temperature very little catalytic oxidation of the combustibles in the exhaust stream will occur.

With continued use of the catalyst, the catalytic activity tends gradually to decline and the minimum catalyst activation temperature gradually increases. This is particularly true when the exhaust stream contains contaminants such as lead compounds resulting from the use of the so-called "leaded" gasolines. The deactivation effect of the lead compounds in the exhaust gases tends to elevate the minimum activation temperature of the catalyst rather quickly to the order of 500° F. to 650° F., for example.

If reliance is placed upon the sensible heat in the exhaust gas stream to raise the catalyst to activation temperature it has been found that in many cases an excessively long period of time is required and/or the elevation of the catalyst to activation temperature can be accomplished only by operating the engine under conditions of relatively high speed and load so as to produce relatively high exhaust gas temperatures. For example, in the case of one exhaust purifier application, gas temperatures entering the catalyst bed at idling and moderate speeds e.g. 35 m.p.h. were of the order of 400° F. to 500° F. If the minimum catalyst activation temperature is 600° F. it is impossible to initiate the catalytic reaction under these driving conditions. In these circumstances it has been found necessary to drive the vehicle at relatively high speeds, e.g. 50 m.p.h., or over hilly terrain so as to obtain gas temperatures entering the catalyst bed of 600° F. and above. Even under these special conditions the maximum temperature of the entering gases may be only slightly above the catalyst activation temperature and an excessively long period of time, such as from 10 minutes to half an hour, may be required to initiate the catalytic reaction. Once initiated, the heat produced by the exothermic catalytic oxidation of the combustible components in the exhaust stream is sufficient to maintain the catalyst temperature above activation level, and under these conditions effective elimination of the combustible components of the exhaust gas occurs. If, for the reasons discussed above, the initiation of the catalytic reaction takes place only after an excessively long period of time or only under special driving conditions, the over-all effectiveness of the purifier is greatly reduced, and its usefulness from a practical standpoint may be virtually destroyed.

It is the general object of the present invention to eliminate the difficulties discussed above by providing a simple and inexpensive method and device for rapidly heating the catalyst mass to its activation temperature. Other more specific objects of the invention will be apparent from the description which follows and the accompanying drawings.

In its broad aspects, the invention employs the principle of using the engine itself to pump a raw, flammable air-fuel mixture from the engine cylinders into a combustion chamber located adjacent to and upstream from the catalyst bed of the purifier. Combustion of this flammable mixture produces a high temperature gas stream at e.g. 1500° F. to 2000° F. which very rapidly effects heating of at least the inlet portion of the catalyst bed above catalyst activation temperatures. Delivery of the flammable air-fuel mixture to the combustion chamber by the engine is accomplished by causing the engine to run for a short length of time with the ignition cut off to all or at least some of the engine spark plugs. As will be pointed out in the subsequent description, this may be accomplished while the engine is running by interrupting and restoring the engine ignition as a whole at short intervals without causing the engine to stop. Alternatively, instead of intermittently interrupting the engine ignition as a whole, the ignition supply to only a portion of the engine spark plugs may be interrupted without causing the engine to stop so that the raw fuel-air mixture fed to the corresponding cylinders will leave the cylinders unburned. For example, in an 8-cylinder engine, the ignition could be interrupted to 2 or even 4 of the cylinders while the others continued to fire. Preferably, the ignition is cut off to the various cylinders in sequence rather than having the same cylinders fail to fire during the entire catalyst activation procedure. That is, rather than cutting off the ignition to the same two selected engine cylinders in an 8-cyclinder engine during the activation procedure, the ignition may be cut off with respect to the first and third cylinders, for example, during the first 8-cylinder firing cycle; with respect to the second and fourth cylinders in the second firing cycle; the third and fifth cylinders in the next 8-cylinder firing cycle, and so forth. A sequential interruption of the ignition to a portion of the cylinders in this manner provides a flammable mixture which may be burned adjacent the catalytic purifier which, when burned at this location, will effect rapid heating of the catalyst.

Reference is now made to the accompanying drawings which illustrate preferred embodiments of the invention.

Fig. 1 is a semi-diagrammatic view showing an embodiment of the invention in which intermittent interruption of the ignition to the engine spark plugs by manual means is used to supply a flammable mixture to the combustion chamber adjacent the catalytic purifier.

Fig. 2 is a graph illustrating the relative rates of heating the catalyst to activation temperature when using the method of the invention and when using only the sensible heat content of the exhaust gases for this purpose.

Fig. 3 is a semi-diagrammatic view of an embodiment of the invention illustrating an automatic system for carrying out the embodiment shown in Fig. 1.

Referring now to Fig. 1, the reference numeral 1 designates the exhaust pipe carrying the engine exhaust gases from the engine exhaust manifold to the catalytic purifier indicated generally by the reference letter P. Before the gases flow into the purifier proper they pass through a venturi type inspirator comprising a converging nozzle 2, an element generally designated by the reference numeral 3 comprising a portion 3a converging in the direction of gas flow and a portion 3b diverging in the direction of gas flow which are connected to form a throat 4. The converging portion 3a forms a chamber 5 around the nozzle 2 which communicates with the atmosphere through the air inlet 6 provided with an air filter 7. In operation, the exhaust gases flowing through the nozzle 2 create a reduced pressure at throat 4 causing the inspiration of air through air inlet 6, the air-exhaust gas mixture thereupon flowing into chamber 8.

In the embodiment shown, chamber 8 serves as a combustion chamber immediately upstream from the catalyst bed. A spark plug 9 is located in the chamber 8 and serves to ignite flammable mixtures entering the chamber 8 as will be described in more detail hereafter.

The purifier comprises a metal housing 10 which is preferably surrounded with a layer of insulation 11. A catalyst bed comprising a layer of small pellets 12 of oxidation catalyst is located between perforated metal plates 13.

The perforated plates 13 are supported at the left-hand end as shown in Fig. 1 by an upright partition 14 and a U-shaped bracket 15, while at the right-hand end plates 13 are supported by the end wall of the purifier housing and a U-shaped bracket 16. Partition 14, as well as supporting the catalyst bed, also serves to partition off the inlet end of the purifier to create the combustion chamber 8.

Any suitable oxidation catalyst capable of operating over relatively long periods at temperatures of from about 600° F. to 1300° F. may be employed. Although the invention is not limited to any particular catalyst, a preferred catalyst comprises small pellets e.g. $\frac{1}{16}''$ to $\frac{1}{8}''$ in size of an activated oxide, such as activated alumina impregnated with a metal or metal oxide, or mixtures thereof, having oxidation activity such for example as platinum, palladium, copper oxide, or mixtures of chromium and copper oxides.

In order to provide the operator of the vehicle with an indication of the proper operation of the purifier, means for detecting the temperature of the catalyst bed, such as a thermocouple 37 connected by lead 38 to an indicating pyrometer 36 located in the driver's compartment may be provided. Preferably, the thermocouple 37 is located in the inlet portion of the bed, that is the portion of the catalyst bed which is first contacted with the exhaust gases. If the layer of catalyst pellets in the purifier shown in Fig. 1 is 2" in thickness, for example, the thermocouple 37 may be advantageously located ½" below the top perforated plate 13. Because of the relatively high rates of heat exchange between the bed of pellets and the gases flowing through it the inlet portion of the bed will be the first portion to reach activation temperature and thus will be the first portion to initiate the catalytic oxidation of the oxidizable constituents in the exhaust gases. In most cases it is not necessary to continue the activation procedure after the inlet portion has been thus activated since the additional heat generated by the catalytic oxidation will heat up the rest of the bed. Thus, when the indicating pyrometer shows the inlet portion at activation temperature, ordinarily the activation procedure can be discontinued.

Electrical energy for the engine ignition circuit and for the spark plug 9 is supplied by the usual battery 17 grounded on the engine frame as at 18. Battery 17 is connected to the ignition switch 20 by lead 19. In one position of switch 20 contact is made simultaneously with terminals 21 and 22 closing the circuit both to the engine ignition through lead 21a and to the spark coil 23 through leads 25 and 26. In a second position of the switch 20 contact is made with terminal 24 which closes the circuit to the spark coil 23 only. As the switch contact arm is moved back and forth between these two positions it may be seen that the engine ignition will be interrupted periodically while the circuit to the spark coil 23 serving spark plug 9 will be made continuously except for the relatively short period when the switch arm is passing through neutral position.

The spark coil 23 has its primary winding 27 connected in series with a customary interrupter comprising a magnetizable conductor 28 biased away from the magnetizable core 29 by a spring 30. The primary winding 27 is grounded at 31.

The secondary winding 32 is grounded at 33 and supplies high voltage current to the spark plug 9 through lead 34 and the usual condenser 35. The coil 23 with its interrupter causes high frequency sparking at the electrodes of spark plug 9 in the well known manner whenever the circuit from the battery 17 to the coil 23 is closed.

In the operation of the embodiment illustrated in Fig. 1, as applied to an automotive vehicle, the engine is started in the usual way, the ignition switch being in the position shown with the circuit to the engine ignition and the spark coil 23 closed. Assuming both the engine and the catalytic purifier are at ambient temperature, and the engine is operating at idling speed, the exhaust gases will be at a temperature of from 200° F. to 300° F., well below the activation temperature of the catalyst. Under these conditions the maximum temperature to be attained by the catalyst will be the temperature of the exhaust gases (200° F.–300° F.).

In order to rapidly initiate the catalytic reaction in accordance with the invention the engine is operated at a fast idling speed, e.g. 1000 to 4500 r.p.m., by opening the throttle. The ignition switch is then manually reciprocated at short intervals between the two positions as described above. Each time the switch is shifted to terminal 24 the ignition to the engine is interrupted, while the spark coil 23 continues to function. As the ignition is interrupted the engine continues to turn over for a short time, e.g. 1 or 2 seconds, due to the inertia of the moving parts.

During the intervals when there is no engine ignition, the engine will continue to inspirate a full throttle fuel-air mixture from the engine intake manifold, and this mixture will be exhausted from the engine cylinders unburned and pumped through the connecting exhaust pipe to the combustion chamber 8. Thus, the chamber 8 will be supplied with a flammable mixture which will be ignited by spark plug 9. The hot combustion products resulting from combustion in chamber 8 at a temperature of e.g. 1500° F. to 2000° F. will be forced by the action of the engine through the catalyst bed and will rapidly heat the inlet portion of the bed.

The frequency with which the engine ignition is thus interrupted and restored should be such that the engine does not stop turning over. The maximum permissible time between engine ignition interruption and restoration will depend upon the speed at which the engine is running. The higher the speed of course the longer will be the permissible interval of interruption, since the engine parts will at higher speeds have a greater momentum. With the average automotive engine it is not practical to effect the ignition interruptions at normal idling speed since at normal idling the engine will tend to stall almost immediately upon ignition interruption.

The sizing and design of the combustion chamber 8 is important with respect to the ignitability of the air-fuel mixtures pumped into it by the engine. Generally speaking, the gas velocity in chamber 8 must not exceed flame propagation velocity or else the mixture will not be ignited. If desired, flame holding baffles of well known design may be incorporated in the combustion chamber 8 to increase the stability of the flame combustion taking place therein. Obviously, the combustion chamber 8 may be constructed as a separate unit apart from the catalyst housing so long as it is located upstream from and adjacent to the catalyst bed. A long connecting conduit between the combustion chamber and the catalyst bed is undesirable from the standpoint of the heat losses that would be encountered.

Following the procedure described above, the gas inlet portion of the catalyst bed is heated above catalyst activation temperature in a manner of e.g. 1 to 2 minutes. The rise in the temperature of the bed inlet portion can be followed from the driving compartment by means of the pyrometer 36, and when this portion of the bed has reached catalyst activation temperature the alternate interruptions of the engine ignition can be discontinued and the vehicle driven in a normal fashion. As thus heated, the inlet portion of the bed will be effective in catalytically oxidizing oxidizable constituents present in the normal engine exhaust, these being usually present in too low a concentration to permit ignition by spark plug 9. The heat thus liberated from the highly exothermic catalytic oxidation maintains the inlet portion of the bed above catalyst activation temperatures and supplies heat to the remaining portions of the bed to bring these portions up to catalyst activation temperatures also.

The above described procedure for quickly activating the catalyst in effect transfers the combustion of all or a portion of the fuel supplied to the engine from the engine cylinders into the combustion chamber located adjacent the catalyst bed. By so doing, the entire heating effect of the fuel burned in the chamber 8 is utilized for heating the catalyst bed. Where the combustion takes place in the engine cylinders the greatest proportion of the heat liberated by combustion of the fuel is absorbed in delivering power, heating up the engine block, transferred to the cooling water or lost in the line from the exhaust manifold to the purifier. As a result the exhaust gases reaching the purifier under normal engine operation are relatively low in temperature and are well below catalyst activation temperatures except when the engine is operating under relatively heavy load. Even then, the exhaust temperature in a vast majority of automotive installations rarely exceeds 800° F. Thus, even under conditions of relatively heavy engine load a relatively small temperature differential exists between the exhaust temperature and the catalyst activation temperature such that a relatively long period is required to bring even the inlet portion above catalyst activation temperature.

When the entire catalyst bed is thus heated to the proper operating temperature and effectively oxidizing the carbon monoxide, hydrogen, and hydrocarbons present in the exhaust stream, it is preferable to let the spark plug 9 remain in continuous operation as in the system illustrated in Fig. 1. This has been found to be quite advantageous in that under certain conditions, particularly deceleration the concentration of combustibles in the exhaust stream reaches flammable limits. These intermittently produced flammable mixtures will likewise be ignited by the spark plug 9, creating a high temperature stream which serves to maintain the catalyst bed at an effectively high temperature. The pre-ignition of these intermittently produced flammable mixtures under ordinary engine operation is doubly advantageous in that these highly concentrated mixtures tend to overload the capacity of the catalyst bed as a result of which at least a portion of such mixtures tend to pass through the catalyst bed unoxidized. By igniting these mixtures in chamber 8, rather than relying entirely on the catalyst bed to oxidize them, the complete oxidation of these mixtures is assured while at the same time their heating value is fully utilized to maintain the inlet portion of the catalyst bed at the desired temperature.

In accordance with the procedure described above, the short interval interruptions of the circuit to the engine spark plugs is carried out when the engine is operating at a fast idle. The ignition interruptions may also be carried out if desired while the engine is under load. In an automotive vehicle, for example, the ignition interruptions may be effected while the vehicle is traveling at cruise downhill or on fairly level terrain. In such circumstances the intervals between ignition interruption and restoration may be longer since the momentum of the vehicle itself will keep the engine turning over for a longer period of time in the absence of engine ignition.

*Example*

A Ford vehicle having an engine with a 240-cubic inch piston displacement was supplied with a catalytic purifier and combustion chamber of the type illustrated in Fig. 1. The catalyst bed consisted of a layer of catalyst pellets approximately .060" in size consisting of activated alumina impregnated with a mixture of copper and chromium oxides, the pellets containing approximately 2.5% each of copper and chromium (as the reduced metal). The catalyst layer was 10" in width, 25" in depth, and 1.5" thick. After operation of the vehicle for 5000 miles equipped with such a purifier, the catalyst activation temperature had risen to approximately 650° F. principally because of the presence of lead compounds in the engine exhaust. Because of this relatively high activation temperature the catalyst bed could be activated only by operating the vehicle under relatively heavy load, such as by driving at 50 m.p.h. and/or on hilly terrain so as to obtain exhaust temperatures somewhat greater than 650° F. Even under these conditions, however, the catalyst was not brought to activation temperature pattern obtained when activating the catalyst bed eration. Curve B in Fig. 2 illustrates the time-temperature pattern obtained when activating the catalyst bed by driving the vehicle at approximately 50 m.p.h. It will be noted that it took approximately 9.5 minutes for the inlet portion of the catalyst bed to reach a level of 650° F.

In contrast, when the catalyst bed was activated by the procedure described above the inlet portion of the catalyst bed was brought well above catalyst activation temperature in two minutes. Curve A in Fig. 2 illustrates the time-temperature pattern obtained when activating the catalyst bed according to the procedure of the invention.

Curve C shows the time-temperature pattern obtained in the catalyst bed when an attempt was made to activate the catalyst by driving the vehicle at a 30 to 35 m.p.h. cruise. Since the exhaust temperature under these conditions is about 400° F., the catalyst never reached activation temperature.

Reference is now made to Fig. 3 of the drawings which illustrates a system for automatically carrying out the activation procedure described above. According to this automatic system, by closing a switch located in the driver's compartment while the engine is idling, the engine is automatically set at a fast idle while at the same time the alternate interruption and restoration of the engine ignition circuit is automatically carried out, and the engine is automatically restored to normal operating condition when the catalyst has reached the proper temperature.

In Figure 3, in which the same reference numerals have been applied to equivalent elements, the exhaust gases from the engine exhaust manifold are conducted by exhaust line 1 to a venturi inspirator of the same construction as in Fig. 1 and thence flow into combustion chamber 8 provided with spark plug 9, through a bed of catalyst pellets 12 contained between perforated plates 13.

Adjacent the outlet from the purifier housing 10 a thermal switch 39 comprising a bi-metallic element 39a and a contact terminal 39b is located. When the gas stream flowing from the catalyst bed is below a predetermined temperature due to low catalyst temperature, the thermal switch is closed thus completing a circuit from the vehicle battery 17, through lead 41, lead 42, switch 43, and leads 44 and 45 to a solenoid operator 46 acting on the carburetor throttle and a circuit interrupter 47 operating on the ignition circuit respectively.

Referring to the solenoid operator 46 it will be seen that when the thermal switch is closed and the switch 43 (which is located in the driving compartment) is closed, the solenoid core 48 will move from right to left as shown in the drawings, rotating throttle shaft 49 in a counter-clockwise direction (thus opening the throttle) by means of linkage arms 50, 51, and 52. Linkage arm 52 is also connected to the accelerator pedal 53 in the driving compartment by means of the usual linkage indicated generally by reference numeral 54. Linkage 52 when not actuated either by the solenoid 46 or the accelerator pedal 53 is biased to idling speed by means of a spring 58.

The circuit interrupter 47 which is in parallel with solenoid 46 with reference to battery 17 may be any of the well known devices commercially available for interrupting and restoring the circuit to the engine ignition at predetermined intervals of e.g. one to two seconds.

A second circuit, in parallel with the circuit just described, is connected from the battery 17 through lead 41, lead 70, ignition switch 71, lead 72, to the ignition circuit of the engine by lead 73 and to a spark coil 23 serving spark plug 9 by lead 74. When ignition switch 71 is closed coil 23 is continually supplied with current while the circuit is also continuously completed to the engine ignition except as interrupted by interruptor 47 during the catalyst activation procedure.

In the operation of the system shown in Fig. 3, the engine is started by the starter motor after closing the ignition switch 71 leaving switch 43 open. Assuming the catalyst is below activation temperature as indicated by the pyrometer 36, with the engine at idling, switch 43 is then closed manually by the vehicle operator. Through the action of the solenoid 46 the engine is automatically set at a fast idle and simultaneously the interrupter 47 operates to alternately interrupt and restore the engine ignition at such intervals that the engine does not stall but continues to turn over during the interval of ignition interruption due to the momentum of the moving parts.

As with the embodiment illustrated in Fig. 1, the unburned fuel-air mixture exhausted during periods of engine ignition interruption is burned in the chamber 8 and the hot gases resulting serve to rapidly heat the catalyst to its activation temperature. When the catalyst, or at least the inlet portion thereof, has reached the proper temperature the thermal switch 39 opens whereupon the engine reverts to normal idling operation. The catalytic oxidation of the combustible constituents in the exhaust gases will then serve to maintain the catalyst at the proper operating temperature under most normal driving conditions.

After completion of the activation procedure it is preferable to open switch 43 as a safety precaution. Once the bed is activated, thermal switch 39 will normally remain open. However, abnormal driving conditions, such as prolonged cruise on level ground at a relatively low speed, may cause the catalyst temperature to drop to an abnormally low level which may result in closing thermal switch 39. This eventuality, plus other contingencies, such as malfunctioning of the thermal switch, may result in the undesired functioning of the circuit interrupter 47 and solenoid 46 while the vehicle is in motion, and to prevent this from occurring it is preferable to open switch 43 during vehicle operation. The proper functioning of the catalytic purifier can be continuously observed by means of the pyrometer 36.

By the use of the present invention the catalyst bed may be brought to an effective operating temperature in a short time, although the catalyst activation temperature may have increased to levels of e.g. 600° F. to 700° F. through prolonged use. This in effect prolongs the useful life of the catalyst. The equipment required for carrying out the invention is simple and inexpensive. As pointed out, the precombustion chamber and igniter adjacent the catalyst bed are additionally advantageous for igniting the occasional flammable mixtures encountered during normal operation of the engine. In addition to these elements only a few standard switches and control relays are required for the automatic system of Fig. 3.

It is understood that the scope of the invention is not limited to the specific embodiments described above but is rather to be determined by the reference to the appended claims.

I claim:

1. A method for effecting rapid activation of a catalytic exhaust purifier connected to the exhaust outlet from a spark-fired internal combustion engine comprising the steps of causing the engine to operate intermittently by intermittently interrupting the normal ignition to the engine spark plugs, passing the raw unoxidized fuel-air mixture thereby exhausted from the engine cylinders to a chamber adjacent to and upstream from a catalyst bed, igniting and burning said raw fuel-air mixture in said chamber, the resulting hot combustion products being pumped by the action of said engine through said catalyst bed causing rapid heating thereof, and discontinuing said procedure when at least the inlet portion of said catalyst bed has reached activation temperature and continuing to operate the engine with normal ignition while catalytically oxidizing in said catalyst bed oxidizable constituents exhausted from said engine.

2. A method for effecting rapid activation of a catalytic exhaust purifier connected to the exhaust outlet from a spark-fired internal combustion engine comprising the steps of causing the engine to operate intermittently by intermittently interrupting the normal ignition to the engine spark plugs, passing the raw unoxidized fuel-air mixture thereby exhausted from the engine cylinders to a chamber adjacent to and upstream from a catalyst bed, igniting and burning said raw fuel-air mixture in said chamber, the resulting hot combustion products being pumped by the action of said engine through said catalyst bed causing rapid heating thereof, and discontinuing said procedure when at least the inlet portion of said catalyst bed has reached activation temperature, and thereafter operating said engine under normal conditions while maintaining igniting means in operation in said chamber thereby to ignite flammable exhaust gas mixtures produced during normal engine operation, while catalytically oxidizing non-flammable exhaust mixtures in said catalyst bed.

3. A method for effecting rapid activation of a catalytic exhaust purifier connected to the exhaust outlet from a spark-fired internal combustion engine comprising the steps of running the engine, passing the exhaust products from the engine cylinders through a catalyst bed in said purifier, alternately interrupting and restoring the ignition to the engine at short intervals without stopping said engine whereby the raw unoxidized fuel-air mixture exhausted from the engine cylinders during the interruption of said ignition is pumped by the action of the engine to said exhaust purifier, igniting and burning said raw fuel-air mixture at a point adjacent to and upstream from said catalyst bed, the resulting hot combustion products being pumped by the action of said engine through said catalyst bed causing rapid heating thereof, and discontinuing said ignition interruptions when at least the inlet portion of said catalyst bed has reached activation temperature.

4. A method for effecting rapid activation of a catalytic exhaust purifier connected to the exhaust outlet from a spark-fired internal combustion engine comprising the steps of running the engine, passing the exhaust products from the engine cylinders through a catalyst bed in said purifier, alternately interrupting and restoring the ignition to the engine at short intervals without stopping said engine whereby the raw unoxidized fuel-air mixture exhausted from the engine cylinders during the interruption of said ignition is pumped by the action of the engine to said exhaust purifier, igniting and burning said raw fuel-air mixture to a point adjacent to and upstream from said catalyst bed, the resulting hot combustion products being pumped by the action of said engine through said catalyst bed causing rapid heating thereof, and discontinuing said ignition interruptions when at least the inlet portion of said catalyst bed has reached activation temperature, and thereafter operating said engine under normal conditions while maintaining igniting means in operation in said chamber thereby to ignite flammable exhaust gas mixtures produced during normal engine operation, while catalytically oxidizing non-flammable exhaust mixtures in said catalyst bed.

5. A method for effecting rapid activation of a catalytic exhaust purifier connected to the exhaust outlet from a spark-fired internal combustion engine comprising the steps of running the engine at a fast idling speed such that the engine does not stall when the ignition to the engine spark plugs is interrupted for short intervals, passing the exhaust products from the engine cylinders through a catalyst bed in said purifier, alternately interrupting and restoring the ignition to the engine at short intervals without stopping said engine whereby the raw, unoxidized fuel-air mixture exhausted from the engine cylinders during the interruption of said ignition is pumped by the action of the engine to said exhaust purifier, igniting and burning said raw fuel-air mixture at a point adjacent to and upstream from said catalyst bed, the resulting hot combustion products being pumped by the action of said engine through said catalyst bed causing rapid heating thereof, and discontinuing said ignition interruptions when at least the inlet portion of said catalyst bed has reached activation temperature.

6. In combination with a spark-fired internal combustion engine having spark plugs, a catalytic purifier connected to the exhaust outlet of said engine containing a bed of oxidation catalyst, a combustion chamber located upstream from and adjacent to said catalyst bed, an electric igniter in said combustion chamber which ignites flammable mixtures in said combustion chamber, a circuit for supplying ignition to the engine spark plugs, a switch in series with said circuit and a circuit interrupter for intermittently interrupting the ignition to said engine spark plugs at short intervals to supply said combustion chamber with a flammable mixture from the engine.

7. In combination with a spark-fired internal combustion engine having spark plugs, a catalytic purifier connected to the exhaust outlet of said engine containing a bed of oxidation catalyst, a combustion chamber located upstream from and adjacent to said catalyst bed, an electric igniter in said combustion chamber which ignites flammable mixtures in said combustion chamber, a circuit for supplying ignition to the engine spark plugs, a circuit interrupter for intermittently interrupting said circuit at short intervals to supply said combustion chamber with a flammable mixture from the engine and electrical control means for opening the engine throttle a predetermined amount when said circuit interrupter is operating.

8. In combination with a spark-fired internal combustion engine having spark plugs, a catalytic purifier connected to the exhaust outlet of said engine containing a bed of oxidation catalyst, a combustion chamber located upstream from and adjacent to said catalyst bed, an electric igniter in said combustion chamber which ignites flammable mixtures in said combustion chamber, a circuit for supplying ignition to the engine spark plugs, a circuit interrupter for intermittently interrupting said circuit at short intervals to supply said combustion chamber with a flammable mixture from the engine and control means including a thermal switch responsive to the temperature of said catalyst for actuating the circuit interrupter when the catalyst temperature falls below a predetermined level.

9. In combination with a spark-fired internal combustion engine having spark plugs, a catalytic purifier connected to the exhaust outlet of said engine containing a bed of oxidation catalyst, a combustion chamber located upstream from and adjacent to said catalyst bed, an electric igniter in said combustion chamber which ignites flammable mixtures in said combustion chamber, a circuit for supplying ignition to the engine spark plugs, a circuit interrupter for intermittently interrupting said circuit at short intervals to supply said combustion chamber with a flammable mixture from the engine, electrical means for opening the engine throttle and control means including a thermal switch responsive to the temperature of said catalyst for actuating the circuit interrupter and the throttle opening means when the catalyst temperature falls below a predetermined level.

References Cited in the file of this patent

UNITED STATES PATENTS

| 2,658,742 | Suter et al. | Nov. 10, 1953 |
| 2,807,930 | Bratton | Oct. 1, 1957 |